2,833,800

PROCESS FOR PURIFYING PLUTONIUM

Donald F. Mastick, Napa, Calif., and Arthur C. Wahl, University City, Mo., assignors to the United States of America as represented by the United States Atomic Energy Commission No Drawing. Application December 19, 1947
Serial No. 792,834

1 Claim. (Cl. 260—429.1)

This invention relates to material purification and in its more particular phases provides a method of separating plutonium (element 94) from uranium (element 92) by the preparation of a new composition of matter known as plutonium trioxalate.

It is often desired to obtain a compound of an element which is quite water-insoluble, particularly for separation of that element from other materials. Plutonium as it is usually produced is admixed with uranium and fission products. Consequently it is desirable to obtain compounds of plutonium which have unusual properties in order to assist in the separation from these admixed materials. There is a necessity for a method for separating plutonium from the large amount of uranium from which it has been prepared, as for example by neutron irradiation in a neutronic reactor or when such a preliminary separation has been made and it is desired to remove the last traces of the uranium from the substantially purified plutonium. However, the necessity of separation may occur at any time a quantitative separation of plutonium from uranium and fission products is desired.

Generally speaking, plutonium and uranium are difficult to separate because their chemical properties are so very similar. This similarity may be caused by uranium, neptunium and plutonium and other transuranic elements forming a second series analogous to the rare earths. The chemical similarity of the rare earths is caused by the electrons, which are added as the elements progress in atomic weight, entering into an inner ring rather than into the outer incomplete ring of electrons. This leaves the outer ring structure that mainly controls the chemical properties unchanged. It is possible that in a similar manner, as the series—uranium, neptunium and plutonium and other transuranic elements—increases in atomic weight the added electrons may also fall into an inner ring and thus leave the outer ring structure constant. In any event, the chemical similarity of the three elements must be taken into account when efforts are made to separate them.

In cases where the plutonium is of such low concentration that none of its known compounds will precipitate, use has been made of the carrier method. Essentially this method consists of adding to a solution containing the material to be separated, a finely divided insoluble compound which acts as a carrier for the desired material. Preferably the carrier may be formed in situ by adding its ions. The carrier yields at least one cation and at least one anion which is an ionic component of an insoluble compound of the material to be carried, e. g. plutonium, and it is desirable that the compound formed, e. g. the plutonium compound, be substantially as insoluble as the carrier used. The carrier may yield under certain conditions more than one cation or anion or more than one of both. The mechanism of carrying is not fully understood but is believed to be effected in some cases by the incorporation of the ion to be carried into the carrier crystal lattice, in other cases by surface adsorption of the ion to be carried and in other cases by a combination of both.

The carrier procedure may be effected by any of the known techniques for effecting adequate contact of liquids with insoluble solids.

The use of the carrier procedure for separating plutonium from uranium is complicated by the fact that either (a) isomorphic carriers, i. e., those having a crystalline structure with cation spacing in the crystal lattice such that plutonium ions may be substituted in the lattice for carrier cations, or (b) carriers of the same range of ionic radii are necessary. A carrier must be selected that is not isomorphic with any of the contaminating cations or, in the event this cannot be accomplished, one that is isomorphic with the least number of contaminating cations must be selected and the process repeated.

Another possible method for the purification of plutonium which is present in such low concentration that none of its known compounds will precipitate is the electrodeposition of the plutonium simultaneously with the electrodeposition of a carrier.

Although it is difficult to separate plutonium by electrolytic means, since it is a strongly electropositive metal not far below the alkali metals in the electromotive series, plutonium may readily be electrodeposited as an oxygenated compound by the electrolysis of suitable solutions of plutonium in hydroxyl solvents. These oxygenated compounds are not very satisfactory products since they must be subected to additional processing to prepare intermediate materials for use in making pure plutonium.

The use of electrolytic means to separate plutonium from uranium requires the use of expensive equipment with high power consumption. It requires skilled operators and considerable control equipment, not only for the electrolytic deposition itself but also for the adjusting of the conductivity of the solutions and even the placing of the metals in solution.

A possible method used for concentrating and decontaminating plutonium is the use of a specific adsorbent. This specific adsorbent must have the property of removing plutonium from the solution with which it is in contact. Usually some of the various fission products are also adsorbed. The various fission products can then be successively removed and finally the plutonium can be eluted from the adsorbent with a much smaller volume of solution, resulting in a simultaneous concentration and separation. Several materials have been successfully tried for the adsorbents, including silicious materials, a synthetic titania-mica "zeolite," and a synthetic cation exchange resin (amberlite IR–1).

This procedure can also be repeated or coupled with carrier procedures in the same manner until the desired degree of concentration and purification is obtained. However, the method has a disadvantage of requiring a very considerable plant outlay since a large number of columns or other similar apparatus is necessary in order to present the necessary area.

A fourth method for separating plutonium from other materials is the use of immiscible solvent extraction methods. One of these methods, for example, provides for the separation of plutonium compounds from impurities by a suitable organic solvent which will preferentially dissolve one of the compounds. An ether, such as a dialkyl ether and especially diethyl ether, has been used and other equivalent water-immiscible organic solvents suggested. The method is especially suitable for the treatment of plutonium prepared by the neutron irradiation of uranium where subsequent beta decay occurs and the irradiated slug is dissolved so that the uranium is present as uranyl nitrate hexahydrate. When this procedure is used the uranium remains in the hexavalent state while some or all the plutonium is in the tetravalent state. The organic phase contains the bulk of the uranyl nitrate; the aqueous phase contains the original water of crystallization, a minor part of the uranyl nitrate and the bulk of uranium fission products and plutonium.

Although this process is useful under certain conditions, the solvents create ever-present fire hazards and many of them form explosive concentrations with air. Furthermore many of the solvents give off fumes that are dangerous and in some cases even lethal and thus make necessary special precautions to protect personnel working with the equipment.

None of the above processes, alone or in combination, present a simple, efficient, inexpensive method for completely separating plutonium from uranium and other impurities and yielding a product which is in a satisfactory condition for immediate use or processing without additional steps.

It is thus seen to be a prime object of this invention to provide a method of material purification which will effect the separation of plutonium compounds from impurities in the same solution by preparing a compound of plutonium which can be separated from the rest of the solution because of differences in solubility.

It is a further object of this invention to obtain a simple process carried out with easily and economically designed and manufactured equipment which is capable of a large output with a minimum of control instruments and insulation.

Another object is to obtain a process which is easily operated to cause an efficient separation of uranium and plutonium compounds which does not at the same time require the use of dangerous solvents or the use of compounds which present fire or explosion hazards.

It is a further object of this invention to obtain as the end product in this separation of plutonium and uranium compounds, a compound which can be used immediately in producing the desired end product and which can be easily and conveniently moved or stored for a long period with practically no loss and without excessive precautions or special equipment.

It is a further object of this invention to prepare the new composition of matter which is produced simultaneously as the result of this method of separating plutonium and impurities in solution.

It is a still further object to prepare a new composition of matter, plutonium trioxalate.

Still further objects and advantages of this invention will appear in the following description.

The above objects are accomplished by a novel process which generally comprises the step of reacting plus three plutonium ions with oxalate ions to form the novel plutonium trioxalate.

The process is readily applied to a purification procedure by reacting in solution trivalent plutonium ions with oxalate ions so as to form a precipitate of plutonium trioxalate while leaving impurities in the solution.

More particularly, it is feasible to add to an impure aqueous solution of plutonium containing impurities which do not precipitate with oxalate ions a quantity of material which yields oxalate ions while in aqueous solution. As a result trivalent plutonium oxalate is precipitated in a form which readily settles and is conveniently separated from the aqueous solution containing impurities by any suitable means such as filtration, decantation, centrifugation or the like.

It is possible to pretreat a material containing plutonium and impurities so as to have the impurities non-precipitable by the oxalate ion while having the plutonium in the trivalent state. In this type procedure it is possible to reduce selectively the plutonium, e. g., from hexavalent to trivalent state, while not substantially altering the impurity, such as uranium. On the other hand, it is also feasible to oxidize selectively or to complex the impurities while retaining the plutonium in a reduced state.

The purification process is therefore usually carried out in two or three steps. First, compounds of plutonium and impurities are treated, if necessary, so as to obtain plutonium and the impurities in the proper relative oxidation or valence states. Secondly, an oxalate is added so that plutonium oxalate is formed. Thirdly, the compound is separated by appropriate methods. These steps will be described in detail in the ensuing paragraphs.

The first step of this process is the obtaining of the plutonium and the impurities in the proper oxidation states. Frequently it is necessary to reduce the plutonium while allowing the impurities to remain in an oxidized condition. This is difficult since the starting valence state of the plutonum is not always definitely known. For example this is true of plutonium which is prepared by the neutron irradiation of uranium. When the irradiated slug is dissolved and partly purified by various methods which do not affect the valence state of the plutonium, the plutonium is present predominantly in the plus four valence state but it is also to some extent in the plus six valence state.

A method for reducing the plutonium to the plus three state can better be worked out if the oxidation-reduction potentials can be determined for the $Pu^{III}$—$Pu^{IV}$, $Pu^{IV}$—$Pu^{VI}$ and the $U^{IV}$—$U^{VI}$ couples. The following values have been established for the standard oxidation-reduction potentials in volts, referred to the hydrogen-hydrogen ion couple as zero, for unit activities and temperatures at 25° C.

|  | Volts |
|---|---|
| $Pu^{+III} = Pu^{+IV} + e^-$ | —0.95 |
| $Pu^{+IV} + 2H_2O = PuO_2^{+II} + 4H^+ + 2e^-$ | —1.005 |
| $U^{+IV} + 2H_2O = UO_2^{+II} + 4H^+ + 2e^-$ | —0.41 |

The potential will not be appreciably varied by minor variations in temperature or concentration from the values at standard conditions. In using the various values these limitations must be borne in mind together with the fact that the potentials give no indication as to the speed of the reactions or whether or not an intermediate product is formed which prevents the completion of the reaction despite a favorable potential value. Thus if the appropriate potentials are again examined it may be seen that the selective reduction of plutonyl ion to the plus three plutonium ion can be accomplished while leaving the uranyl ion unreduced by using a reducing agent having an oxidation-reduction potential in volts that is more positive than —0.95 volt (i. e., less negative) and less positive than —0.41 volt (i. e., more negative) and which does not for any reason interfere with the reaction.

The plutonium and impurities are conveniently in the form of nitrates or chlorides. Experience has shown that the preferential reduction of plutonium can best be accomplished by the use of iodide ion ($I^-$). Under the same standard conditions as listed supra the oxidation potential is as follows:

|  | Volts |
|---|---|
| $2I^- = I_2 + 2e^-$ | —0.535 |
| $3I^- = I_3^- + 2e^-$ | —0.54 |

Thus it may be seen that the iodide ion meets the requirement of falling between —0.41 volt and —0.95 volt.

Iodide ion is capable of reducing both plutonium VI and plutonium IV to plutonium III in acid solution. The reactions are relatively fast, the half-time for the reduction of plutonium IV to plutonium III being being of the order of a minute or less. In twenty minutes both plutonium IV and VI are completely reduced. This is proved by the fact that the plutonium remaining in solution when oxalate ion is added after twenty minutes reduction has the normal solubility of plutonium III oxalate.

Hydrogen ion is consumed in the reduction of plutonium VI and may be consumed also in the reduction of plutonium IV if the plutonium IV is partially hydrolized. This is shown clearly in the following equations:

$$2PuO_2^{++} + 8H^+ + 9I^- = 2Pu^{+3} + 3I_3^- + 4H_2O$$
$$2PuO^{++} + 4H^+ + 3I^- = 2Pu^{+3} + I_3^- + 2H_2O$$

Consequently the reduction is somewhat dependent on hydrogen ion concentration. Trouble is sometimes experienced in reducing the plutonium nitrate with potassium iodide if the plutonium is part plutonium VI ion and part plutonium IV ion. Substituting hydrogen iodide for potassium iodide to furnish both hydrogen ions and iodide ions will however correct this trouble. Hydrogen iodide is preferably used for the reduction since it avoids the addition of metallic impurities.

It is necessary to add excess iodide ion to keep the iodine formed in solution as the tri-iodide ion.

It may be seen of course that the plutonium may be originally present in the plus three valence state and the impurities present in a higher valence state and this first step will not be necessary. On the other hand both the plutonium and the impurities may be present in the reduced state. It may then be necessary to oxidize the impurities selectively or to oxidize both and then carry out the step as presented above. The process may be further modified to complex selectively the impurities, or to complex selectively the plutonium and oxidize the impurities. It is possible to use various combinations and variations of the above procedures.

The second step in the preferred process is to separate the plutonium which has been reduced to the plus three state by the addition of an oxalate, preferably not in large excess of that needed to form the precipitate. This addition of an oxalate, either as oxalic acid and/or any of the soluble oxalates, such as sodium oxalate, ammonium oxalate, potassium oxalate or lithium oxalate, simultaneously effects the separation of plutonium from impurities such as uranium and yields a new composition of matter now known as plus three plutonium oxalate or as plutonium trioxalate. The plus three plutonium oxalate is a green crystalline precipitate which settles easily even after several washings. Although there is little difficuty in obtaining a plus three plutonium oxalate precipitate which settles rapidly as a reasonably compact mass, somewhat more dense precipitates can be obtained when the precipitation is made from a solution high in hydrogen ions. When this plus three plutonium oxalate is precipitated on a plant scale from an aqueous solution the oxalate is a blue-green crystalline solid with a bulk-density (after settling 15 minutes) of 0.2–0.5 gram of plutonium per milliliter. The formula of the oxalate is presumed to be $Pu_2(C_2O_4)_3 \cdot XH_2O$ and crude experiments have given values for X between nine and ten.

Since plutonium plus three complexes are readily soluble in potassium oxalate or oxalic acid solution to give a soluble green oxalate complex, the excess of oxalic acid used for precipitation has to be controlled rather well. It was found best to keep the concentration of excess oxalic acid less than 0.4 molar and have the hydrogen ion concentration greater than 0.5 molar to keep the association of oxalic acid down to the minimum.

The solubility product of plus three plutonium oxalate, $[(Pu^{+++})^2(C_2O_4^{--})^3]$, is not constant because excess oxalate ion tends to complex the plutonium III oxalate back into solution. However, in a solution containing 1 to 5 molar hydrogen ion and about 0.2 molar oxalic acid with very low oxalate ion concentration, the solubility product is constant within the experimental error and has a value of about $10^{-26}$. A few experimental determinations have shown that the plus three plutonium oxalate has a solubility of the order of 6 milligrams per liter in a solution which is 0.1 molar in oxalic acid and from 0.2 to 0.4 molar in hydrochloric acid as compared with the solubility of plus four oxalate in the same solution, which is of the order of 1 gram per liter. It has also been found that in solutions of nitric or hydrochloric acid in which hydrogen ion is 1 molar and oxalic acid is 0.1 molar, the solubility in milligrams of plutonium per liter appears to be given by the relation 3.24 times the concentration of hydrogen ion in moles per liter raised to the third power times the concentration of the oxalic acid in moles per liter raised to the minus three halves power. This may be expressed algebraically $$[3.24 \cdot (H)^3 \cdot (H_2C_2O_4)^{-3/2}]$$

Thus, this oxalate is one of the more insoluble oxalates known. For this reason the second step of precipitating the plus three plutonium oxalate from aqueous solution is easily and efficiently carried out.

It is clear of course that this formation of the oxalate need not be made in solution and in particular in an aqueous solution but that it may be accomplished in any desired manner.

The third step in this process is the separation of the plus three plutonium oxalate. The method of preparing the plutonium trioxalate fixes the range of methods to be used in its separation. For example if it was prepared by precipitation of the plutonium trioxalate from an aqueous solution, the separation is not difficult to accomplish since, as stated supra, the precipitate is dense and easily handled and the separation is usually accomplished by decanting, but it can be accomplished by centrifuging, filtering or any of the other methods known to those skilled in the art for separating solids from solutions.

The plus three plutonium oxalate can be easily washed with water since, unlike the plus four plutonium oxalate, which forms a white or pale green precipitate, it is not appreciably soluble in water, being of the order of 10 milligrams of plutonium per liter of water at room temperature. However the amount of washing should be restricted because the oxalate has a tendency to peptize, particularly if it is washed repeatedly with large volumes of water. If the oxalate is thus peptized, this will cause difficulties in later operations because the peptized oxalate when ignited gives an oxide which requires much longer metallurgical treatment for conversion to other forms of plutonium.

The method of this invention of separating plutonium by the precipitation of plus three plutonium oxalate is feasible since, under the conditions used, uranyl oxalate has a solubility of 28 milligrams of uranium per liter whereas plus three plutonium oxalate has a solubility of only 0.45 milligram of plutonium per liter. This makes possible the reduction of the concentration of the impurities by a factor of at least from 20–50 by a single oxalate precipitation.

It can thus be seen that this plutonium oxalate method of separating plutonium has the additional advantage that in addition to appreciably reducing concentration of uranium, which is very difficult to accomplish, it also substantially removes many of the impurities present as fission products.

The oxalate is a desirable final precipitate in the purification process because it is capable of being dried without splattering, owing to its very low solubility in water and to the resulting essentially normal water vapor pressure of the slurry and because it is stable to heat. It can be heated for considerable time at an advanced temperature such as 80° C. in the presence of the usual supernatant containing hydrochloric and oxalic acid solutions without perceptible change in crystal size, color or quantity.

The plutonium trioxalate method is efficient since the amount of plutonium lost during the oxalate precipitation of plus three plutonium oxalate in solution and the solid suspended particles of plutonium oxalate in the supernatants and washings is quite low. Over a period of time, when operated in large scale plutonium production the loss due to the precipitation steps and two or three washing steps was of the order 0.5 percent of the total plutonium involved. The washings of course can be recycled.

The method has the further advantage that although the separation factor of plutonium from impurities is as stated, that is, 20–50, and may require two oxalate precipitations if the amounts of impurities are great, each of these steps can be used to good advantage. Often when processing plutonium, the initial valence state of the plutonium is not known. When the plutonium trioxalate precipitation is used as the first procedure in the processing, the processing can be planned from that procedure on using a compound of known composition. Many of the prior methods of producing plutonium result in a plutonium product which is either in solution or which is difficult to handle. On the other hand when the oxalate precipitation is used as the last step in a purification process, the plus three plutonium oxalate is obtained as a desirable solid concentrated end product.

Regardless of the method by which it is produced, the novel composition of matter, plus three plutonium oxalate, has a number of distinctive properties that make it very desirable. For example it can be used in preparing halogenated compounds of plutonium such as plus three plutonium chloride, plus three plutonium fluoride, plus three plutonium iodide and plus four plutonium fluoride by a direct, rapid simple conversion such as dry chemistry conversion. This conversion is effected by passing the hydrohalide over the dry oxalate at an elevated temperature with or without an oxidizing or reducing agent. The plutonium oxalate can also be conveniently dried and ignited to the dioxide. The plus three plutonium oxalate is also readily dissolved and oxidized by nitric acid and sodium bromate to plus six plutonyl nitrate and carbon dioxide. The plus three plutonium oxalate is also readily converted without introducing impurities to a number of other plutonium compounds which are useful either for storing the plutonium without loss or as a raw material for further processing.

Thus the method of this invention, in a simple three step process, gives an excellent separation of plutonium from impurities by simultaneously forming the desirable and novel end product, plus three plutonium oxalate.

*Example I*

The method which is presented in this example has been successfully used on a plant scale in the following manner. A liter of concentrated paste solution containing 160 grams of plutonium as mixed plus four and plus six plutonium nitrate in 1.5 molar nitric acid is carefully analyzed and placed in a storage container. This paste, which has been obtained by partial decontamination and purification of plutonium produced by the neutron irradiation of uranium, contains partially purified plutonium present with impurities which have not been removed by the prior steps. The impurities comprise uranium and many of the various radioactive fission products.

As soon as it is desired to process the batch, the nitrate paste is transferred from the storage container to the jacketed work tanks by dissolving the paste and washing the containers by the addition of approximately 1.1 liters of one molar aqueous nitric acid solution to obtain the mixture plus four and plus six plutonium nitrates as approximately 0.3 molar plutonium solution.

This solution is cooled to approximately 15° C. and about 1.2 liters of 5.5 molar hydrogen iodide are then added and thoroughly agitated. The solution is then permitted to stand for at least twenty minutes in order to insure complete reduction of the plutonium to the plus three valence state. The resulting 3.3 liters of solution then have the following approximate composition.

0.2 molar plus three plutonium ion
2 molar hydrogen ion
1.2 molar nitrate ion
1 molar iodide ion
0.3 molar tri-iodide ion 3.5 liters of 0.67 molar oxalic acid are then added to the solution and the slurry is agitated for 20 minutes and then allowed to stand. After standing about fifteen minutes, the supernatant then has the following approximate composition.

1.3 molar hydrogen ion
0.6 molar nitrate ion
0.5 molar iodide ion
0.2 molar tri-iodide ion
0.2 molar oxalic acid The supernatant is then siphoned off and is recycled. 8 liters of a solution 0.1 molar in oxalic acid and 0.1 molar in nitric acid is then introduced to wash the precipitate. The stirrer is started as soon as 1 liter of wash is added and is continued for five minutes after all the wash has been added. The slurry is then allowed to stand until the precipitate settles.

The supernatant wash solution is siphoned off and recycled, and the washing operation is repeated exactly as before. 8 liters of a solution 0.1 molar in oxalic acid and 0.1 molar in nitric acid is again used to wash the precipitate. After the slurry has been agitated and then permitted to settle the supernatant is withdrawn for recycling and the precipitate is given a final washing with 8 liters of water. Again the slurry is agitated and then permitted to stand. The supernatant wash solution is siphoned off and recycled, and the washed plutonium trifluoride is finally separated from the remaining solution by filtration. The precipitate is then dried. The product is in the form of blue-green crystals of regular shape and is substantially pure plutonium trioxalate. It consists of 99.2 percent of the plutonium in the original solution which has been purified from at least 20 to 50 fold of all impurities.

A variation of the present invention comprises the oxidation of the plutonium in the solution, treatment with a soluble oxalate such as oxalic acid to precipitate materials such as calcium which might also be precipitated with the plutonium if it were in the plus three valence state, separating this impurity precipitate, reducing the plutonium to plus three valence state, for example, with a soluble iodide, and then precipitating the plutonium with a soluble oxalate such as oxalic acid.

Another possibility is to add a reducing agent to an aqueous solution containing the higher valence plutonium and oxalate ion whereby the plutonium is reduced and reacts directly with the oxalate ion to precipitate plus three plutonium oxalate.

Of course the various purification procedures mentioned in introductory paragraphs of this application may be used in combination with the presently proposed procedures of this application.

The soluble iodide as noted before is preferably hydrogen iodide but other iodides may be used, such as alkali metal iodides and ammonium iodide.

Of course, if the impurity will not precipitate with oxalic acid, it is not necessary to use a selective reducing agent such as is employed for separating the plutonium from uranium but it is feasible to use a reducing agent having a potential more positive than —0.95 volt. For example, one may conveniently use sulfur dioxide or sodium sulfide.

The foregoing examples, procedures and theory of the reactions are given for the purpose of illustrating the present invention but are not intended to be limiting on the scope thereof. Since many widely different embodiments of the invention can be made without departing from the spirit and scope thereof, it is to be understood that this application is not to be limited except as indicated in the appended claim.

What is claimed is:

A process which comprises treating solutions of higher valence plutonium and hexavalent uranium with a soluble iodide to obtain plutonium in the plus three state, while leaving the uranium in the hexavalent state, adding a soluble oxalate, and then separating the insoluble plus three plutonium oxalate from the solution.

References Cited in the file of this patent

Connick et al.: "The +3 Oxidation State of Plutonium," MDDC-339, August 10, 1946, declassified October 4, 1946.

The above essentially duplicated in:

Seaborg et al.: "The Transuranium Elements," pub. by McGraw-Hill Book Co., Inc. N. Y. (1949), pages 175–179, in vol. IV–14B; part I relied on.

Mastick et al.: "Ultramicrochemical Investigations of Solubilities of Some Plutonium Compounds," MDDC-1761; date of manuscript February 22, 1944; date declassified February 25, 1948; 4 pages.

Harvey et al.: Jour. of the Chem. Soc., August 1947, pp. 1010–1021.

Patton: "Note on the Preparation of Plutonium (III) Oxalate" (found in Seaborg et al., as above, article based on Project report CN–1324 (February 1, 1944), p. 8.

Westrum et al.: "The Preparation and Properties of Plutonium Oxides," as above, p. 936. Article based on reports the latest being issued December 14, 1944.

Seaborg et al.: J. Amer. Chem. Soc. 70, 1128–34 (1948); article based on report issued March 21, 1942, the 1942 date is relied on. (Page 1129 relied on.)

Seaborg: Chemical and Eng. News, vol. 23, No. 23, pp. 2190–2193, December 10, 1945.